United States Patent Office 2,992,090
Patented July 11, 1961

2,992,090
HERBICIDAL PELLETS
Clarence A. Littler, Wilmington, Del., assignor to E. I. du Pont de Nemours and Company, Wilmington, Del., a corporation of Delaware
No Drawing. Filed Mar. 27, 1958, Ser. No. 724,260
2 Claims. (Cl. 71—2.5)

This invention relates to dense, rapidly-disintegrating herbicidal pellets having a high dry-strength and to methods for making the same.

In applying herbicides directly to the ground in overgrown regions, especially in arid regions, it is usual to apply the herbicide in the form of a dense pellet, especially when the herbicide is applied from an airplane. Such pelletized formulations readily fall through trees, brush and foilage to the ground. Dust and liquid herbicidal compositions are obviously not at all well-suited for such use.

Conventional herbicidal pellets have proven satisfactory in areas of heavy rainfall or when the active herbicidal agent used in the pellets is water-soluble. But such conventional pellets require plenty of water to free the active herbicidal ingredient.

Conventional pellets are virtually useless in dry, arid regions, particularly when the active herbicidal agent used is only very slightly soluble in water, as many desirable herbicides happen to be. For example, conventional herbicide pellets applied by air to arid regions have been found substantially intact on inspection six months after application. The pellets could be gathered up like marbles. At best, only an extremely small amount of the active pesticide had been liberated.

To use pellets containing water-insoluble herbicides in dry, hot, arid regions it is necessary, ideally, to so construct the pellets that they will fall apart in the presence of small amounts of moisture. The active water-insoluble herbicides can then spread out on and be carried into the soil. Obviously, under these circumstances the water-insoluble herbicides must be dispersed and washed into the soil rapidly to enable the herbicides to reach the roots of plants and thus exert their herbicidal effect before the free soil moisture again evaporates.

By the term "water-insoluble herbicide" as used in this application is meant that a particular herbicide is soluble in water to an extent of not greater than about 0.5 weight percent of herbicide in water. Lesser amounts will, of course, dissolve in water, and in fact some solubility, for example less than 0.5 percent, is necessary; for, in order to exert their effect, herbicides must be in solution in the soil moisture and so move through the soil and roots into plants.

In order to maximize the amount of water-insoluble herbicide available for water solution from pellets cast over dry, arid regions, one needs pellets which disintegrate rapidly and with a minimum of moisture, and thereby exposing the largest possible surface area of water-insoluble herbicide to any moisture which may be present. It has not been possible to achieve these properties with conventional pellets.

I have now discovered methods and compositions for making rapidly disintegrating herbicidal pellets using water-insoluble herbicides which have the advantages of being not only rapidly disintegrating, but also of having a high dry-strength. My hard and compact pellets can be stored without crumpling into dust for indefinitely long periods of time even when exposed to air having a high relative humidity, and they show only minimal dusting whe handled while dry. Yet they disintegrate very rapidly with but very little moisture. Even light rain or moist soil in the absence of rainfall causes my pellets to disintegrate. After disintegration, the herbicidally active material is liberated and spreads out on the ground thereby exposing maximum surface area to available precipitation and soil moisture resulting in greatly improved solubilization and soil penetration. Moisture wets these pellets readily and breaks them up into tiny, non-cohering fragments which spread out in a well-dispersed form under the impact of even light rain.

Even though the pellets disintegrate with a minimum of moisture, they have a high dry-strength and disintegrate exceedingly little when handled while dry. This is of critical importance because pellets are frequently applied by means of airplanes or similar equipment where pellets are shaken, vibrated and otherwise handled before application. If pellets do not have dry-strength they can fracture, chip, or abrade from the surface and small particles and dust are formed which can drift over areas where no herbicidal action is needed.

It is entirely novel and unexpetced that pellets can be made which combine high dry-strength and low wet-strength. The fact that these pellets combine high dry-strength with low wet-strength without losing the advantages of pelletizing makes the compositions of this invention entirely novel and unexpected and gives them great utility.

Specifically, my invention is directed to pellets having average diameters of from about $\frac{1}{16}''$ to $\frac{1}{4}''$ and average lengths of from about one to three times the average diameters. These pellets have a density of from about 1.2 to 1.7 grams per cubic centimeter, depending upon the herbicide content and the extrusion pressures used. Their dry-strength is such that not more than about 0.3% by weight of the pellets pass through a 20-mesh screen when 100 grams are subjected to shaking and pounding. Best of all, these pellets have a disintegration rate such that not more than about 20% by weight of the pellets is retained by a 20-mesh screen after being stirred for ten minutes in water. With the best pellets of the invention, no portion of the pellets remains on the screen.

Broadly, these pellets comprise from about 10 to 75 parts by weight of finely divided, solid water-insoluble herbicide having an average particle size of less than about 325 mesh, from about 20–80 parts by weight of a non-gelling clay having an average particle size of less than about 325 mesh, from about 5 to 25 parts by weight of anhydrous sodium sulfate having an average particle size of less than about 200 mesh, and from about 0.25 to 2.0 parts by weight of an anionic wetting agent having an average particle size of less than about 200 mesh, the total parts by weight in any one composition being 100.

The term "mesh" as used herein has reference to the U.S. Sieve Series established by the U.S. Bureau of Standards in 1919 and the numbers used are sieve numbers which correspond closely to the meshes per lineal inch. The sieve openings which correspond to each sieve number can be found in any chemistry handbook, e.g., Lange's "Handbook of Chemistry."

Optionally, the pellets of this invention can contain a very small amount, usually from about 0.02 to 3 parts by weight, of an inert pigment having an average particle size of less than about 2 microns. Such a pigment can be used to color the pellets.

The finely-divided solid water-insoluble herbicides useful in the processes and compositions of this invention can be selected from among any herbicides having these properties, provided, of course, that the herbicidal material is not reactive with the other components of my compositions. When I use my methods and compositions, however, I prefer to use either the herbicidally active aryl alkyl ureas or the herbicidally active s-triazines.

The herbicidally active aryl alkyl ureas usable in the compositions and methods of the present invention can be selected from among those described in Todd U.S. Patents Nos. 2,655,444 through 2,655,447. By way of example, herbicidally active aryl alkyl ureas represented by the following formulas can be used:

1)

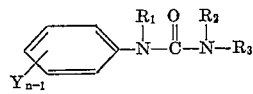

wherein Y is selected from the group consisting of hydrogen and halogen, $n$ is a positive whole number less than 5, $R_1$ is selected from the group consisting of hydrogen and methyl, $R_2$ is selected from the group consisting of methyl and ethyl, and $R_3$ is selected from the group consisting of hydrogen and alkyl of less than 5 carbon atoms.

Illustrative of the aryl aliphatic urea herbicidal compounds of Formula 1 are:

1-phenyl-3-methylurea
1-phenyl-3,3-dimethylurea
1-phenyl-1,3-dimethylurea
1-phenyl-1,3,3-trimethylurea
1-phenyl-3-ethylurea
1-phenyl-3,3-diethylurea
3-phenyl-1-(n-btuyl)-1-methylurea
1-(p-chlorophenyl)-3-methylurea
1-(o-chlorophenyl)-3,3-dimethylurea
1-(p-chlorophenyl)-3,3-dimethylurea
1-(m-chlorophenyl)-3,3-dimethylurea
1-(p-chlorophenyl)-1,3-dimethylurea
1-(p-chlorophenyl)-1,3,3-trimethylurea
1-(p-chlorophenyl)-3-ethylurea
1-(p-chlorophenyl)-3,3-diethylurea
3-(p-chlorophenyl)-1-(n-butyl)-1-methylurea
1-(p-fluorophenyl)-3,3-dimethylurea
1-(p-bromophenyl)-3,3-dimethylurea
1-(p-iodophenyl)-3,3-dimethyl urea
1-(2,4-dichlorophenyl)-3,3-dimethylurea
1-(3,4-dichlorophenyl)-3,3-dimethylurea
1-(3,4-dichlorophenyl)-3,3-diethylurea
3-(3,4-dichlorophenyl)-1-methyl-1-(n-butyl)urea
1-(2,4,6-trichlorophenyl)-3,3-dimethylurea
1-(3,4,5-trichlorophenyl)-3,3-dimethylurea
3-(3,4-dichlorophenyl)-1-ethyl-1-n-butyl urea The best aryl aliphatic ureas for use with my compositions and methods are 1-(p-chlorophenyl)-3,3-dimethylurea (monuron); 1-phenyl-3,3-dimethylurea (fenuron); 1-(3,4-dichlorophenyl)-3,3-dimethylurea (diuron); and 3-(3,4-dichlorophenyl)-1-methyl-1-(n-butyl)urea (neburon).

The herbicidally active triazines which are particularly useful in the compositions and methods of this invention can be represented by the following formula:

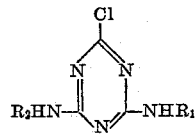

where $R_1$ and $R_2$ are the same or different and are selected from the group consisting of alkyl of less than 4 carbons and $—(CH_2)_n—OCH_3$, and $n$ is an integer selected from the group consisting of 2 and 3.

Illustrative of the herbicidally active triazines of Formula 2 are:

2,4-bis(methylamino)-6-chloro-1,3,5-triazine
2,4-bis(ethylamino)-6-chloro-1,3,5-triazine
2,4-bis(propylamino)-6-chloro-1,3,5-triazine
2-chloro-4-isopropylamino-6-methylamino-1,3,5-triazine
2,4-bis(2-methoxyethylamino)-6-chloro-1,3,5-triazine
2,4-bis(3-methoxypropylamino)-6-chloro-1,3,5-triazine
2-chloro-4-(2-methoxyethylamino)-6-(3-methoxypropylamino)-1,3,5-triazine
2-chloro-4-ethylamino-6-(3-methoxypropylamino)1,3,5-triazine The best herbicidally active s-triazines for use with my compositions and methods are:

2,4-bis(ethylamino)-6-chloro-1,3,5-triazine,
2,4-bis(3-methoxypropylamino)-6-chloro - 1,3,5 - triazine and
2-chloro-4-ethylamino-6 - (3-methoxypropylamino - 1,3,5-triazine.

When I use the term "solid" in connection with the active herbicides which can be used in my methods and compositions, I mean herbicides melting above 40° C.

When I use the term "water-insoluble" when referring to the herbicidally active compounds used in my compositions and methods, I mean that these compounds have a solubility as defined earlier, i.e., such that not more than ½ weight percent of herbicide is soluble in water at 25° C.

Preferably, anhydrous sodium sulfate having an average particle size of less than 50 microns is used in the pellets of the invention, although anhydrous sodium sulfate having an average particle size of less than 200-mesh can be used. The pellets can contain from about 5 to 25 parts by weight of anhydrous sodium sulfate but it is preferred to use from about 10 to 15 parts by weight of anhydrous sodium sulfate in the pellets.

In general, any conventional anionic wetting agent or agents can be used in my pellets. Such anionic wetting agents can be used either alone or in combination with a wetting promoter such as a ditertiary acetylenic glycol. Suitable anionic wetting agents include sodium lauryl sulfate, sodium N-methyl-N-oleyltaurate, dioctylsodiumsulfosuccinate, long chain esters of sodium isethionate, sodium salts of alkyl benzene sulfonates, sodium salts of petroleum sulfonates, and sulfonated esters of fatty alcohols. I prefer to use the alkyl naphthalene sulfonic acid derivatives in my pellets.

While the compositions of this invention can in general contain from about 0.25 to 2.0 parts by weight of an anionic wetting agent, it is preferred to use from about 0.25 to 1.0 part by weight of anionic wetting agent. Also, it is preferred to use an anionic wetting agent having a size less than about 50 microns, although anionic wetting agents having a mesh size less than about 200 mesh can be used. When used in solution during preparation, of course, particle size plays no role.

As noted above, pigments can be added to the pellet formulations of this invention to provide easy identification in bulk and also to aid ground observers in their identification of treated from untreated areas. Also, pigments give an indication of the uniformity of pellet distribution. The highest pigmenting power is obtained with carbon blacks which are available in particle sizes as low as 10–100 millimicrons. As little as 0.02 to 0.05% of such blacks will impart a deep gray color to extruded pellets. However, in some areas of application such pellets may blend with the soil background and not be readily seen. A yellow color is readily detected by the eye against most backgrounds and is therefore a preferred color for identification. Maximum tinting power of yellow pigments such as Toluidine yellow is obtained when the pigment is the "water-dispersible" type. Such pigments are made by wet-grinding the pigment particles in the presence of a large amount of a dispersant until the majority of the particles are below 2 microns, then drying the pigment and dispersant together so that the dried agglomerates will redisperse when moistened.

Such pigments have low tinting power when dry mixed with other powdered components but develop intense color when redispersed by moisture. From 0.5 to 3.0% of such pigments can be added to a pellet formulation of this invention. Moderate color is developed during the water-mixing step prior to extrusion which is adequate for identification, but even more intense color develops as pellets disintegrate with rain or soil moisture.

Preferably, the finely divided solid, water-insoluble herbicides used in the pellets of this invention are present in the pellets to an extent of about from 20 to 60 parts by weight. The active herbicidal materials have an average particle size of less than 20 microns.

The clay used in these granular compositions functions primarily as a binder. Any of the well-known binder clays can be used for this purpose, provided that the clay is of a non-gelling type. If a clay is used which gels when wet, the pellets do not disintegrate, but rather merely swell, retaining the herbicide. Various mixtures of types of clays can be used, with minor amounts of the mixture being gelling clays, so long as the over-all clay mixture is non-gelling when exposed to water. Thus common clays, such as china clay, can be used as a non-gelling clay binder in my compositions.

However, I greatly prefer to use a calcium, magnesium montmorillonite clay, commonly referred to as a sub-bentonite in my compositions. In contrast to the swelling type of montmorillonite in which most of the calcium and magnesium is replaced with sodium or hydrogen ions, the calcium, magnesium montmorillonite clays are substantially non-swelling. A common example of such a clay, although by no means the only one, is a clay found at Cheko, California.

As has been noted above, the compositions of this invention preferably contain from about 20 to 80 parts by weight of non-gelling clay having an average particle size of less than about 325 mesh. More particularly, however, I prefer to use a non-gelling clay having an average particle size of less than about 5 microns in quantities such that the compositions of the invention contain from about 30 to 70 parts by weight of such clay.

Preferably the pellets of this invention contain from about 20 to 60 parts by weight of herbicidally active aryl alkyl urea having an average particle size of less than about 20 microns, from about 30 to 70 parts by weight of a calcium, magnesium montmorillonite clay having an average particle size of less than about 5 microns, from about 10 to 15 parts by weight of anhydrous sodium sulfate having an average particle size of less than about 200 mesh, from about 0.3 to 1.5 parts by weight of an alkyl naphthalene sulfonic acid, sodium salt having an average particle size of less than about 20 microns, and from about 1 to 3 parts by weight of Toluidine Yellow W.D. having an average particle size of less than about 2 microns, the total parts by weight in any one composition being 100.

To prepare the pellets of this invention, the various constituents as above-indicated are intimately mixed together. One may mix the constituents having the proper particle sizes or alternatively one can mix larger sizes together and then grind the resulting composition down to one having an average particle size of less than about 20 microns. The wetting agents or agent can alternatively be introduced with the pelletizing water.

The resulting blended mixture of components is then moistened with from about 10 to 20% by weight of water.

If the pre-mix which is to be extruded contains too much water, the mixture extrudes very easily and the resulting pellets are low in density. Two effects are noted if too much water is used. First, the dried pellets are weak and brittle and show excessive breakup in dry handling and agitation. Second, the clay binder becomes like cement and resists breakup in the presence of moisture.

The pellets showing most rapid disintegration are those that are held together more by the initial high compression of extrusion than by the cementing action of a wetted and dried clay.

Extrusion can be carried out using conventional equipment such as piston extruders, screw extruders and other typical machines of the types well known to the art. As has been discussed, the water content is kept as low as possible without excessive extrusion pressure. Conventional extrusion pressures and techniques are used. Usually extrusion pressure does not exceed 10,000 pounds per square inch. No more than partial hydration of the anhydrous sodium sulfate results during the pellet formation. Most preferred operating ranges for extrusion are in the range from about 2,000 to 6,000 pounds p.s.i. The amount of water added to the dry mixture for extrusion is critical in that the amount of water added as well as the extrusion pressure critically affects the density of the resulting pellet.

Pellet sizes from $\frac{1}{16}$ to $\frac{1}{4}$ inch in diameter are preferred, depending upon the particular end use to be made of them. In extremely arid regions, where only one or two rains can be expected per season, it is normally advantageous to use $\frac{1}{16}$ inch pellets since more herbicide foci per sq. ft. are applied to the soil and less spread of herbicide by rainfall is required. In addition, if widespread, grasslike vegetation is to be destroyed, it is necessary to have short distances between pellets to kill effectively. On the other hand, woody brush and vines like mesquite with a spreading root system require only a few point contacts of the root system with a concentrated source of herbicide to cause kill. In such a case, results are often better obtained with larger pellets which provide a reserve supply of herbicide; this causes deeper soil penetration over a smaller area.

For most brush areas in the Southwestern United States, the most effective size for airplane application has proved to be $\frac{1}{8}''$ pellets. The best size for hand application is frequently $\frac{1}{4}''$ pellets since they can be placed with discrimination above root systems and deep penetration obtained due to high local reserve supply.

After extrusion, the pellets are dried at temperatures below the melting points of the herbicidal materials used. In general, a drying temperature will range from about 40° to 100° C. The time necessary for drying will vary over a wide interval but usually times of less than 20 hours are used. Preferably, the pellets are dried in the higher temperatures for shorter intervals of time, say 5 to 10 hours.

As was noted earlier, the disintegration rate of the pellets is such that not more than about 25% of the pellet is retained by a 20-mesh screen after ten minutes stirring in water. Normally, the amount will not exceed 15%. This test is more particularly described as follows:

One gram of pellets is weighed to the nearest 5 mg., selecting whole, unshattered pellets. Two-hundred fifty ml. of water is placed in a 400 ml. beaker. A stirring motor equipped with a metal paddle blade 1.5 inches long and 0.5 inch wide is set in position so that the paddle shaft is 0.75 inch off center in the beaker and the blade is immersed ½ of the water depth. Agitation is adjusted to approximately 50 r.p.m., and the pellets are added all at once.

The pellets should move around on the bottom but should not lift off the bottom appreciably. A stop watch is started at the time of pellet addition and agitation is continued for 10 minutes. At the end of this time, the contents of the beaker are poured rapidly through an 8-inch 20-mesh screen. An additional 250 ml. of water is used in two portions to rinse the beaker and this is also poured through the screen. The pellet residue not passing through the screen is dried at 100° C. and weighed. A satisfactory pellet does not leave more than 25% residue by weight compared with the original pellet weight on the screen. Superior pellets will leave 0–10%.

As was noted above, the dry strength of the pellets of this invention is such that not more than 0.3% by weight of the pellets pass through a 20-mesh screen after the pellets are shaken and pounded in a standard unit. This unit is a standard "Ro-Tap" machine in which pounding and shaking lasts for an interval of three minutes. A 100-gram sample of prescreened material is placed on an 8-inch 20-mesh screen on a "Ro-Tap" machine which is then operated for three minutes. The fines produced which pass the 20-mesh screen are collected and weighed.

Although the pellets of this invention disintegrate rapidly when wet, they are not hydroscopic and can be exposed to a relative humidity of 80% without pellet disintegration and without surface chalking upon redrying.

As has been noted, the rapidity of disintegration is most important. Obviously, in arid regions little moisture is available to cause disintegration of the pellets. The pellet must exert its herbicidal action by disintegrating rapidly for, if the pellet has not disintegrated shortly after the first drops of rain reach the soil surface, it may well redry and not disintegrate. Then the herbicide lies on top of the ground and is unable to reach the plant roots.

In order that the invention can be better understood, the following examples are given in addition to those set forth above. These examples illustrate typical pellets of the invention, methods for their preparation, herbicidal applications and the results obtained. When numbers are used following the tabulated ingredients, the numbers represent parts by weight of the ingredients unless otherwise noted.

EXAMPLE 1

The following composition is prepared by blending and micropulverizing the substituted urea, sodium sulfate and wetting agent to an average particle size of less than about 20 microns and then reblending this mixture with the clay which has an average particle size of less than about 20 microns. About 12% by weight of water is then blended into the mixture to form an extrudable mix. The slightly moist powder is then extruded, using a Sprout-Waldron extruder, and dried to form hard non-dusty pellets.

| | Percent |
|---|---|
| 3-(p-chlorophenyl)-1,1-dimethylurea | 25.5 |
| Sodium sulfate anhydrous | 10.0 |
| Alkyl naphthalene sodium sulfonate | 1.0 |
| Ca, Mg bentonite | 63.5 |

The dry pellets are applied by airplane to black-jack oak and post oak on Texas range land. A root kill of 100% is obtained with no new sprouting after two years.

The pellets, when moistened with water, wet readily and break up rapidly into tiny non-cohering fragments that spread out in well-dispersed form under the impact of even light rainfall. In contrast, pellets prepared in a conventional manner from powdered herbicide and a clay binder shed light rainfall when resting on the ground and resist wetting for some time. When finally wet, there is only slow disintegration. Pellets of this type that are applied to a Texas mesquite-covered area can be gathered up as pellets under the trees several months later after repeated rains.

Other pellets prepared with a gelling montmorillonite clay swell to two or three times their original size when wet, remaining as coherent gels in their original shape and failing to disintegrate.

EXAMPLE 2

| | Percent |
|---|---|
| 3-(p-chlorophenyl)-1,1-dimethylurea (less than 20 microns) | 50 |
| Sodium sulfate anhydrous (less than 100 mesh) | 10 |
| Sodium "Lorol" sulfate (less than 20 microns) | 1 |
| Clay (non-gelling china) (less than 325 mesh) | 39 |

The above composition is prepared by blending and micropulverizing, followed by moistening with 15% water and extruding under a pressure of 3000 lbs./sq. in. When dry, the pellets are dropped into water. Visible disintegration is noticeable in 30 seconds and complete breakdown of the pellet in 10 minutes.

EXAMPLE 3

| | Percent |
|---|---|
| 3-phenyl-1,1-dimethylurea (less than 20 microns) | 25.0 |
| Sodium sulfate anhydrous (less than 100 mesh) | 5.0 |
| Ester of sodium isethionate (less than 20 microns) | 1.0 |
| Ca, Mg bentonite (less than 325 mesh) | 69.0 |

The substituted urea, sodium sulfate and wetting agent are first blended and micropulverized then reblended with the clay, and finally moistened and extruded. When the dried pellets are placed on a moist blotter, they crack and collapse within a few minutes.

EXAMPLE 4

| | Percent |
|---|---|
| 3-phenyl-1,1-dimethylurea (less than 20 microns) | 80.0 |
| Sodium alkyl naphthalene sulfonate (less than 20 microns) | 1.75 |
| Methyl cellulose (less than 20 microns) | 0.25 |
| $Na_2HPO_4$ (less than 20 microns) | 0.8 |
| Attapulgite clay (less than 325 mesh) | 17.20 |

An 80% wettable powder of the substituted urea was first prepared with the above composition by blending the dry ingredients together, then micropulverizing and reblending. This wettable powder was then combined with sodium sulfate and clay in the following proportions:

| | Percent |
|---|---|
| Above wettable powder | 31.25 |
| Minus 100 mesh anhydrous $Na_2SO_4$ | 10.0 |
| Ca, Mg bentonite (less than 325 mesh) | 58.75 |

This composition is blended, moistened with water, extruded and dried. The pellets are then applied by airplane at the rate of 4 lbs. active per acre to an area of mixed brush. The treatment produces severe injury to whitebrush, blackbrush, catclaw, granjeno, mesquite, lote and soapbrush in spite of the fact that only 6 inches of rain fell between the application time of December 16 and the observation period of July 14.

EXAMPLE 5

The following pelletized herbicidal compositions are prepared in accordance with the procedure of Example 1:

A

| | Percent |
|---|---|
| 3-(3,4-dichlorophenyl)-1,1-dimethylurea (less than 20 microns) | 40 |
| Anhydrous sodium sulfate (less than 100 mesh) | 25 |
| Sodium lauryl sulfate (less than 20 microns) | 1 |
| Clay (non-gelling china) (less than 325 mesh) | 34 |

B

| | Percent |
|---|---|
| 3-phenyl-1,1-dimethylurea (less than 20 microns) | 75 |
| Anhydrous sodium sulfate (less than 100 mesh) | 5 |
| Alkyl naphthalene sulfonic acid, Na salt (less than 20 microns) | 2 |
| Ca, Mg bentonite (less than 325 mesh) | 18 |

EXAMPLE 6

A hot solution of 18.4 parts of cyanuric chloride in 40 parts of acetone is added in a thin stream to a well-stirred mixture of 60 parts of ice and water. To the resulting slurry is added dropwise at 0° C. (more ice may be added if necessary) a solution of 6.2 parts of methylamine in 20 parts of acetone. The mixture is stirred for 30 minutes and the temperature allowed to rise to 20–25° C. A solution of 8 parts of sodium hydroxide in 20 parts of water is added dropwise after which the mixture is stirred at 45–50° C. for 30 minutes. The resulting crystalline white 2,4-bis(methylamino)-6-chloro-1,3,5-triazine is collected, washed with water, and dried, M.P. >300° C.

EXAMPLES 7–10

The following compounds are prepared in accordance with the procedure of Example 6 by substituting for the methylamine of Example 6 equivalent amounts of the amines set forth in Table I:

Table I

| Example | Amine Reactant | Product |
| --- | --- | --- |
| 7 | ethylamine | 2,4-bis(ethylamino)-6-chloro-1,3,5-triazine. |
| 8 | propylamine | 2,4-bis(propylamino)-6-chloro-1,3,5-triazine. |
| 9 | 2-methoxyethylamine | 2,4-bis(2-methoxyethyl-amino)-6-chloro-1,3,5-triazine. |
| 10 | 3-methoxypropylamine | 2,4-bis(3-methoxypropyl-amino)-6-chloro-1,3,5-triazine. |

EXAMPLE 11

A hot solution of 18.4 parts of cyanuric chloride in 40 parts of acetone is added in a thin stream to a well-stirred mixture of 60 parts of ice and water. To the resulting slurry is added dropwise at 0° C. (more ice may be added if necessary) a solution of 5.9 parts of isopropylamine (amine No. 1) in 20 parts of acetone followed by a solution of 4 parts of sodium hydroxide in 10 parts of water. The mixture is stirred at 0° C. for 30 minutes, then the temperature is allowed to rise to 20–25° C. while a solution of 3.1 parts of methylamine (amine No. 2) is added dropwise. Finally, a solution of 4 parts of sodium hydroxide in 10 parts of water is added dropwise at 20–25° C. and the suspension is stirred at that temperature for 2 hours. The resulting white crystalline 2-chloro-4-isopropylamino-6-methylamino-1,3,5-triazine is collected by filtration, washed with water, and dried.

EXAMPLES 12 AND 13

The following compounds are prepared in accordance with the procedure of Example 11 by substituting for the amines of Example 11 equivalent amounts of the amines set forth in Table II.

Table II

| Example | Amine No. 1 | Amine No. 2 | Product |
| --- | --- | --- | --- |
| 12 | 3-methoxy-propylamine. | 2-methoxy-ethyl amine. | 2-chloro-4-(2-methoxy-ethylamino)-6-(3-methoxypropyl-amino)-1,3,5-triazine. |
| 13 | do | ethylamine | 2-chloro-4-ethyl-amino-6-(3-methoxypropylamino)-1,3,5-triazine. |

EXAMPLE 14

| | Percent |
| --- | --- |
| 2,4-bis(methylamine)-6-chloro-1,3,5-triazine (less than 20 microns) | 25.0 |
| Sodium sulfate anhydrous (less than 100 mesh) | 5.0 |
| Ester of sodium isethionate (less than 20 microns) | 1.0 |
| Ca, Mg bentonite (less than 325 mesh) | 69.0 |

The substituted s-triazine, sodium sulfate and wetting agent are blended and micropulverized, then reblended with clay, moistened and extruded. When the dried pellets are placed on a moist blotter, they crack and collapse within a few minutes.

EXAMPLE 15

| | Percent |
| --- | --- |
| 2,4-bis(ethylamino)-6-chloro-1,3,5-triazine (less than 20 microns) | 80.0 |
| Sodium alkyl naphthalene sulfonate (less than 20 microns) | 1.75 |
| Methyl cellulose (less than 20 microns) | 0.25 |
| $Na_2HPO_4$ (less than 20 microns) | 0.8 |
| Attapulgite clay (less than 325 mesh) | 17.20 |

An 80% wettable powder of the substituted s-triazine is first prepared with the above composition by blending the dry ingredients together, then micropulverizing and reblending. This wettable powder is then combined with sodium sulfate and clay in the following proportions:

| | Percent |
| --- | --- |
| Above wettable powder | 31.25 |
| Minus 100 mesh anhydrous $Na_2SO_4$ | 10.0 |
| Ca, Mg bentonite (less than 325 mesh) | 58.75 |

This composition is blended, moistened with water, extruded and dried. The pellets are applied by airplane at the rate of 4 lbs. active per acre to an area of mixed brush. The treatment produces severe injury to whitebrush, blackbrush, catclaw, granjeno, mesquite, lote and soapbrush in spite of the fact that only 6 inches of rain fell between the application time of December 16 and the observation period of July 14.

EXAMPLE 16

The following composition is prepared by blending and micropulverizing the substituted s-triazine, sodium sulfate and wetting agent, and then reblending this mixture with the clay. About 12% by weight of water is then blended into the mixture to form an extrudable mix. The slightly moist powder is then extruded, using a Sprout-Waldron extruder, and dried to form hard non-dusty pellets.

| | Percent |
| --- | --- |
| 2,4-bis(3-methoxypropylamino)-6-chloro-1,3,5-triazine (less than 20 microns) | 25.5 |
| Sodium sulfate anhydrous (less than 100 mesh) | 10.0 |
| Alkyl naphthalene sodium sulfonate (less than 20 microns) | 1.0 |
| Ca, Mg bentonite (less than 325 mesh) | 63.5 |

The dry pellets are applied by airplane to black-jack oak and post oak on Texas range land. A root kill of 100% is obtained with no new sprouting after two years.

The pellets, when moistened with water, wet readily and break up rapidly into tiny non-cohering fragments that spread out in well-dispersed form under the impact of even light rainfall.

In contrast, pellets prepared in a conventional manner from powdered herbicide and a clay binder shed light rainfall when resting on the ground and resist wetting for some time. When finally wet, there is only slow disintegration. Pellets of this type that are applied to a Texas mesquite-covered area can be gathered up as pellets under the trees several months later after repeated rains.

Other pellets prepared with a gelling montmorillonite clay swell to two or three times their original size when wet, remaining as coherent gels in their original shape and failing to disintegrate.

EXAMPLE 17

The following pelletized s-triazine compositions are prepared in accordance with the procedure in Example 16:

| | Percent |
| --- | --- |
| 2,4-bis(propylamino)-6-chloro-1,3,5-triazine (less than 20 microns) | 40.0 |
| Anhydrous sodium sulfate (less than 100 mesh) | 25.0 |
| Sodium lauryl sulfate (less than 20 microns) | 1.0 |
| Clay (non-gelling) (less than 325 mesh) | 34.0 |

EXAMPLE 18

| | Percent |
| --- | --- |
| 2,4-bis(2-methoxyethylamino)-6-chloro-1,3,5-triazine (less than 20 microns) | 25.0 |
| Sodium sulfate anhydrous (less than 100 mesh) | 5.0 |
| Ester of sodium isethionate (less than 20 microns) | 1.0 |
| Ca, Mg bentonite (less than 325 mesh) | 69.0 |

The substituted s-triazine, sodium sulfate and wetting agent are blended and then reblended with the clay, moistened and extruded. When the dried pellets are placed on a moist blotter, they crack and collapse within a few minutes.

EXAMPLE 19

The following pelletized s-triazine compositions are prepared in accordance with the procedure in Example 16:

| | Percent |
|---|---|
| 2,4 - bis(3 - methoxypropylamino) - 6 - chloro-1,3,5-triazine (under 20 microns) | 25.0 |
| Sodium sulfate anhydrous (under 100 mesh) | 10.0 |
| Sodium isethionate, oleic ester (under 20 microns) | 0.25 |
| Ca, Mg bentonite (under 325 mesh) | 64.75 |

EXAMPLE 20

| | Percent |
|---|---|
| 2 - chloro - 4 - isopropylamino - 6 - methylamino-1,3,5 - triazine | 80.0 |
| Sodium alkyl naphthalene sulfonate | 1.75 |
| Methyl cellulose | 0.25 |
| $Na_2HPO_4$ | 0.8 |
| Attapulgite clay | 17.20 |

An 80% wettable powder of the substituted s-triazine is first prepared with the above composition by blending the dry ingredients together, then micropulverizing to a particle size less than 20 microns and reblending. This wettable powder is then combined with the sodium sulfate and clay in the following proportions:

| | |
|---|---|
| Above wettable powder | 31.25 |
| Minus 100 mesh anhydrous $Na_2SO_4$ | 10.0 |
| Ca, Mg bentonite (under 325 mesh) | 58.75 |

This composition is blended, moistened with water, extruded and dried. The pellets are then applied by airplane at the rate of 4 lbs. active per acre to an area of mixed brush. The treatment produces severe injury to whitebrush, blackbrush, catclaw, granjeno, mesquite, lote and soapbrush in spite of the fact that only 6 inches of rain fell between the application time of December 16 and the observation period of July 14.

EXAMPLE 21

The following pelletized s-triazine compositions are prepared in accordance with the procedure in Example 16:

| | Percent |
|---|---|
| 2 - chloro - 4 - (2 - methoxyethylamino) - 6 - (3-methoxypropylamino) - 1,3,5 - triazine (less than 20 microns) | 50.0 |
| Sodium sulfate, anhydrous (less than 100 mesh) | 10.0 |
| Sodium petroleum sulfonate (less than 20 microns) | 1.5 |
| Ca, Mg bentonite (less than 325 mesh) | 38.5 |

EXAMPLE 22

The following pelletized s-triazine compositions are prepared in accordance with the procedure in Example 16:

| | Percent |
|---|---|
| 2 - chloro - 4 - ethylamino - 6 - (3 - methoxypropylamino) - 1,3,5 - triazine (less than 20 microns) | 75.0 |
| Anhydrous sodium sulfate (less than 100 mesh) | 5.0 |
| Alkyl naphthalene sulfonic acid, Na, salt (less than 20 microns) | 2.0 |
| Ca, Mg bentonite (less than 325 mesh) | 18.0 |

EXAMPLE 23

In the following pelletized herbicidal composition the substituted urea is first blended with the clay and wetting agent and micropulverized until the active agent is substantially all below 20 microns. Clay as received is much finer than this so the grinding action has little effect on the clay. It is present during grinding solely as a grinding aid for the active material. The product is then blended with −200 mesh commercial salt cake and the dye.

The dye is a fine powder less than 200 mesh as received. It exists as water-dispersible agglomerates made up of ultimate particles of less than 2 microns in size, but these agglomerates do not break up until water is available to disperse them. Blending is carried out in a ribbon blender for thirty minutes.

At the end of the dry-blending period, water is sprayed on the charge while blending proceeds until the mixture contains 17.5% water. This mixture is then fed into a Sprout-Waldron extruder and extruded through a die with ⅛″ circular openings. As the product emerges from the die, it is chopped into ⅛″ by 3/16″ lengths by a set of whirling knives, the speed of which is regulated to conform to the speed of extrusion. The pellets are collected and tray dried at 120° F. for 18 hours or until a blank sample, prepared separately, has dried to its original weight. The resulting pellets are hard, smooth and shiny on the cylindrical surfaces but with a fractured appearance on the ends. They run about 10,000 pellets per pound. Approximately 20 well-formed pellets are individually calipered for length and diameter and are then weighed. From these measurements the density is calculated to be 1.64 grams per cubic centimeter.

One hundred grams of pellets are placed on an 8-inch, 20-mesh screen, fitted with a lid above and a pan below. This is then placed on a "Ro-Tap" machine which oscillates the screen and pounds the lid simultaneously. At the end of three minutes, the screen assembly is taken from the machine, the pan is removed and the fines of less than 20 mesh are brushed out of the pan. The weight of the fines is found to be 0.27 gram.

One gram of well-formed pellets, free from fractured or excessively short pieces, is weighed out on paper. A 400 ml. beaker is partially filled with 250 ml. of water and a stirring paddle measuring 1.5 by 0.5 inches is immersed until its shaft extends half through the liquid and 0.75 inch off center in the beaker. The agitation speed is adjusted to 850 plus or minus 50 r.p.m., and the pellets dropped in. After exactly 10 minutes, the stirring is stopped and the beaker contents poured rapidly through a 20-mesh screen followed by two portions of rinse water of 125 ml. each. The residue on the screen when dried and weighed amounts to 0.02 gram:

| | Percent |
|---|---|
| 3-phenyl-1,1-dimethylurea | 25.5 |
| Sodium sulfate anhyd. tech. | 10.0 |
| Alkyl naphthalene sulfonic acid sodium salt | 1.0 |
| Toluidine yellow WD | 3.0 |
| Ca, Mg bentonite | 60.5 |

This application is a continuation-in-part of my earlier application Serial No. 587,919, filed May 29, 1956, now abandoned.

I claim:

1. Dense, rapidly disintegrating herbicidal pellets having a high dry-strength, made by extrusion and having a density of from 1.2 to 1.7 grams per cubic centimeter, said pellets comprising from about 10 to 75 parts by weight of herbicidally active aryl alkyl urea represented by the formula (1) 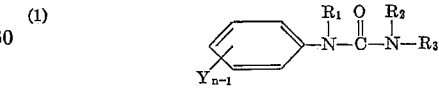

wherein Y is selected from the group consisting of hydrogen and halogen, $n$ is a positive whole number less than 5, $R_1$ is selected from the group consisting of hydrogen and methyl, $R_2$ is selected from the group consisting of methyl and ethyl, and $R_3$ is selected from the group consisting of hydrogen and alkyl of less than 5 carbon atoms, said urea having an average particle size of less than about 20 microns, from about 18 to 85 parts by weight of non-gelling calcium-magnesium montmorillonite clay having an average particle size of less than about 325 mesh, from about 5 to 25 parts by weight of anhydrous sodium sulfate having an average particle size of less than about 100 mesh, and from about 0.25 to 2.0 parts by weight of anionic wetting agent having an average particle size of less than about 20 microns, the total parts by weight in any one composition being 100.

2. Dense, rapidly disintegrating herbicidal pellets having a high dry-strength, made by extrusion and having a density of from 1.2 to 1.7 grams per cubic centimeter, said pellets comprising from about 10 to 75 parts by weight of herbicidally active s-triazine represented by the formula

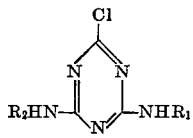

where $R_1$ and $R_2$ are the same or different and are selected from the group consisting of alkyl of less than 4 carbons and $-(CH_2)_n-OCH_3$, and $n$ is an integer selected from the group consisting of 2 and 3, said s-triazine having an average particle size of less than about 20 microns, from about 18 to 85 parts by weight of non-gelling calcium-magnesium montmorillonite clay having an average particle size of less than about 325 mesh, from about 5 to 25 parts by weight of anhydrous sodium sulfate having an average particle size of less than about 100 mesh, and from about 0.25 to 2.0 parts by weight of anionic wetting agent having an average particle size of less than about 20 microns, the total parts by weight in any one composition being 100.

References Cited in the file of this patent

UNITED STATES PATENTS

| | | |
|---|---|---|
| 2,695,840 | Leppla | Nov. 30, 1954 |
| 2,709,648 | Ryker et al. | May 31, 1955 |
| 2,720,480 | Wall | Oct. 11, 1955 |
| 2,792,295 | Wright | May 14, 1957 |

FOREIGN PATENTS

| | | |
|---|---|---|
| 1,135,848 | France | Dec. 29, 1956 |
| 123,579 | Australia | Dec. 7, 1944 |